United States Patent [19]

Cooper

[11] 4,114,290
[45] Sep. 19, 1978

[54] ARITHMETIC DICE GAME

[76] Inventor: James B. Cooper, 627 Main, Apt. A, Vallejo, Calif. 94590

[21] Appl. No.: 708,841

[22] Filed: Jul. 26, 1976

[51] Int. Cl.$^2$ ............................................. G09B 19/02
[52] U.S. Cl. ....................................... 35/31 R; 35/70; 273/145 CA; 273/146
[58] Field of Search ................. 35/31 R, 31 B, 31 D, 35/31 F, 31 G, 22 A; 273/145 R, 145 C, 145 CA, 145 D, 146

[56] References Cited

U.S. PATENT DOCUMENTS

| | | | |
|---|---|---|---|
| 645,112 | 3/1900 | Mapes | 273/146 |
| 1,400,887 | 12/1921 | Liebman | 35/31 D |
| 1,455,098 | 5/1923 | Warren | 35/31 D |
| 1,766,134 | 6/1930 | Lauterbach | 273/145 D |
| 3,204,345 | 9/1965 | Buckner | 35/31 B |
| 3,314,168 | 4/1967 | Heckman | 35/31 G |
| 3,356,369 | 12/1967 | Stubbmann | 273/145 CA |
| 3,710,455 | 1/1973 | Liveridge et al. | 35/22 A |
| 3,959,893 | 6/1976 | Sigg | 35/31 G |

FOREIGN PATENT DOCUMENTS 361,654  11/1931  United Kingdom ................ 273/145 C Primary Examiner—William H. Grieb
Attorney, Agent, or Firm—Bielen and Peterson

[57] ABSTRACT

A game for children for aiding them in learning their arithmetic tables, particularly multiplication, the game includes a game board with a centrally located transparent hemispheric shell mounted on a flexible leaf spring, a plurality of dice which are contained within the hemisphere then become changed in position by depressing and releasing the hemispheric shell and a peg board with associated pegs for scoring correct answers to the changed dice by one or the other of two players. The game board includes a receptacle for storage of the pegs, the receptacle having a slide cover on which the arithmetic tables are set forth for verifying the answer of the player whose turn it is to provide the correct answer to the arithmetic operation displayed.

4 Claims, 7 Drawing Figures

ARITHMETIC DICE GAME

BACKGROUND OF THE INVENTION

This invention relates to a game device for aiding children in learning arithmetic calculation. Often children are unable to memorize fundamental mathematical calculations from tables. However, such children readily assimulate such fundamental calculation or operations when coupled with the playing of a competitive game. While flash cards, on which individual incompleted numerical operations are painted on one side and the answer on the opposite side, provide the simplest alternate manner of aiding in the learning of arithmetic tables, children soon tire of such cards and they become ineffective. In addition, to a test method of learning, it is desirable that a mechanical operation be employed to liven the learning process and retain the interest of the learner. Pursuant to this objective a simple dice game has been devised to enable the learning of the basic arithmetic tables of addition, subtraction and multiplication.

SUMMARY OF THE INVENTION

The game device of this invention employs a pair of numerically imprinted dice with a third operant die contained in a hemispherical retainer forming a portion of a shaker or "popper". The shaker is mounted on a game board having a set of peg holes and a peg receptacle for each of two players on opposite sides of the top of the board. The hemispherical retainer is mounted on a crimped leaf spring which forms an additional element of the shaker. The dice rests on the leaf spring which abruptly clicks when the hemispherical retainer is depressed and released. The click of the leaf spring mixes or rearranges the orientation of the dice to generate a chance created new pair of numerals and operant for a player to mentally calculate and answer. If the player is correct, which may require consulting of a card table to verify, the player is permitted to place a peg in one of the holes representing the two numbers.

There are several alternate schemes that can be used to organize a competitive game. For example, a limited number of pegs, such as twenty-five, can be supplied to each player. Alternating turns and manipulating the shaker on each turn, each player attempts to provide the correct answer for the arithmetic problem displayed. If successful, the player places a peg in the hole representing the numerals of the problem. The first player to dispose of all pegs wins.

A long version of such a game would require all peg holes to be filled before a winner is declared. In such situations, a substantial degree of luck as well as skill is involved, since once the same numerical pair has been correctly determined, its reappearance simply wastes one's turn. For example, if the number pair 6 and 5 appears twice to satisfy $6 \times 5$ and $5 \times 6$ on the peg board, its recurrence will be redundant.

Many variations of the above are permissible in devising games that can be played with the physical arrangement of the game device shown in the drawings and described in greater detail in the following description.

DETAILED DESCRIPTION OF THE PREFERRED EMBODIMENTS

Figure 1:
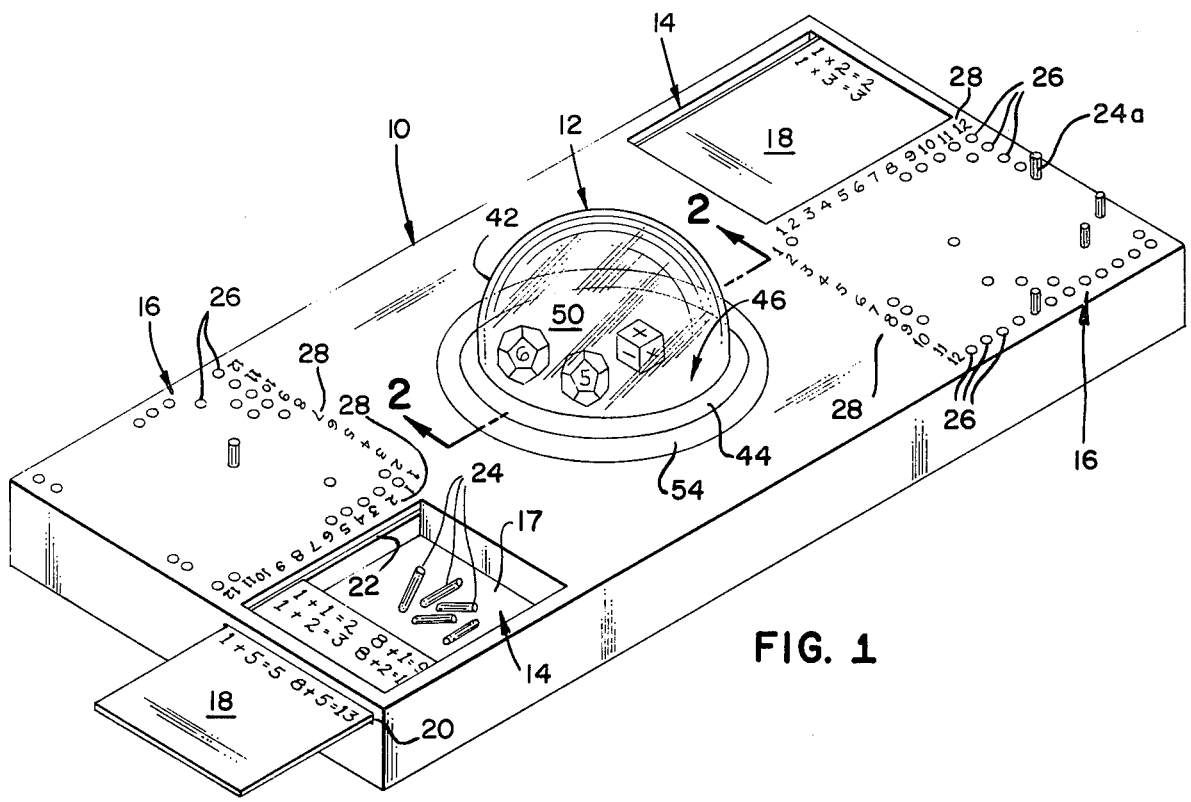
FIG. 1 is a perspective view of the gameboard of this invention.

Referring to the perspective view of the device in FIG. 1, a rectangular game board 10 for aiding in the learning of arithmetic tables is shown. The game board 10 includes a centrally located shaker 12 or "popper" for generating the numbers and operants used in playing a variety of competitive games primarily involving two players.

On each side of the game board are identical storage containers 14 and peg boards 16 for each of two players. The storage containers 14 each comprise a recessed rectangular receptacle 17 having a slide cover 18 which slides in a slot 20 at the end of game board and along a pair of grooves 22 (one visible in FIG. 1) in the receptacle 17 to cover the receptacle when the game is not in use. A plurality of small elongated pegs 24 are stored in the receptacle and exposed for use when the cover 18 is withdrawn. Adjacent the containers 14 on each side of the game board is the peg board 16 which comprises a twelve by twelve field of peg holes 26. The rows and columns of peg holes 26 are marked by numerical indicia 28 from 1 to 12, such that any hole can be defined by a row and column number. For example, the peg designated 24a can be identified as 5, 12 being in row 5 and column 12. If a multiplication operand is in use in the game, the peg would represent a successful answer to $5 \times 12$.

Figure 3A:
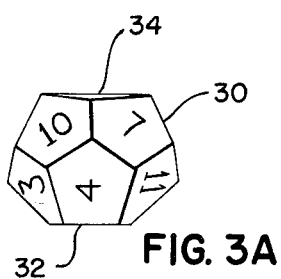
FIG. 3a is a perspective view of the preferred configuration of the number bearing dice.
Figure 3C:
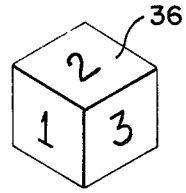
FIG. 3c is a perspective view of an alternate number bearing die.

In the preferred embodiment, the dice used for generating the numbers are dodecahedrons, as shown by the exemplar 30 in FIG. 3a. The dodecahedron is a uniform polyhedron with 12 sides. When resting on a bottom face 32, it includes a parallel horizontal top face 34 that can be used for select numeral display in the same manner as a conventional cubic die. Unlike a conventional die, the faces of the dodecahedron are marked with numerals rather than dots. Use of the dodecahedron allows numbers from 1 to 12 to be included on the twelve faces thereby covering traditional arithmetic tables. To differentiate between, for example, $6 \times 5$ and $5 \times 6$, the dice may be of different color, one die being blue and one die being red. A rule that the number of the red die was first in the arithmetic function would eliminate duplication. For beginning students, a pair of cubic die 36 as shown by the exemplar in FIG. 3c can be used instead of the dodecahedral die 30. This would permit only the lower end of the arithmetic tables from 1-6 to be utilized on the game device.

Figure 3B:
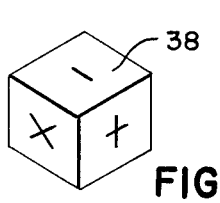
FIG. 3b is a perspective view of the preferred operant bearing die.
Figure 3D:
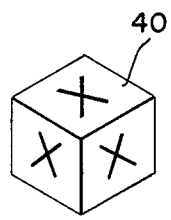
FIG. 3d is a perspective view of an alternate operant bearing die.

The operant for the numerals can be mixed on a cubic die 38 as shown in FIG. 3b, where the three useable operants plus, minus, and multiply are symbolically displayed on the faces of the cubic die 38. Preferably each of the three operants appear twice, on opposite faces of the die. Alternately, a cubic die can include on its faces only one operant such as the die shown in FIG. 3d. This is desirable where only one arithmetic table needs to be worked on by the players. In such case, three separate operant dice would be included in the game device, whereby the players can selectively utilize one of them in the shaker.

The shaker 12 comprises a transparent plastic hemispheric shell 42 mounted in a deformable seating gasket 44 on a leaf spring 46. The dice used, rest on the leaf spring 46 and are visible through the hemispheric shell 42. The shell 42 is easily removable from the seating gasket 44 allowing the dice to be replaced with other different dice as desired.

Figure 2:
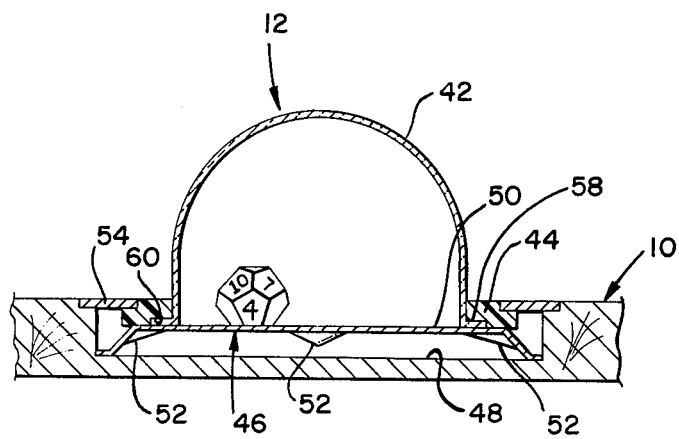
FIG. 2 is a cross sectional view taken on the lines 2—2 in FIG. 1.

The construction of the shaker 12 is shown with greater detail in FIG. 2. Referring to FIG. 2, the leaf spring 46 is seated in a recess 48 in the game board 10. The leaf spring 46 is deformed to provide an elevated platform 50 on which the dice rest. Several small partial crimps 52 in the edge of the platform create a slight convex bow in the surface of the platform which can be deformed to an unstable opposite concave bow when the shell 42 is pushed down with the hand. When the shell is released the leaf spring abruptly pops back to its original position reorienting any dice resting thereon.

The seating gasket 44 is mounted on the leaf spring 46 and under an annular retaining ring 54 fastened to the top of the gameboard. The shell has a projecting lip 58 which engages a peripheral notch 60 in the seating gasket 44 and is thereby retained on the leaf spring. The seating gasket is sufficiently deformable to allow easy removal and replacment of the hemispheric shell 42.

Figure 4:
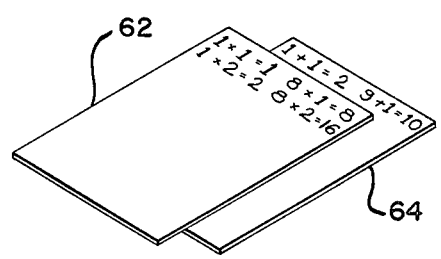
FIG. 4 is a perspective view of the reference table cards.

Referring to FIG. 4, two cards, 62 and 64 are shown which include the arithmetic tables involved in this game device. The tables are used to check the answers given during the course of the game, if deemed necessary by the players. In the preferred embodiment, the cards are semi-rigid and comprise the covers 18 for the peg receptacles.

While in the foregoing specification embodiment of the invention have been set forth in considerable detail for purposes of making a complete disclosure of the invention it will be apparent to those skilled in the art that numerous changes may be made in such details without departing from the spirit and principles of the invention.

What is claimed is:

1. An improved game device for aiding in the learning of certain arithmetic tables comprising:
  a. a game board having at least two dice with faces having numeric indicia on said faces, and an additional die having at least one arithmetic operant from the group of add, subtract and multiply,
  b. means mounted on said game board for containing and reorienting said dice comprising a transparent hemispherical shell, a leaf spring over which said shell is mounted, the shell and leaf spring defining an enclosure within which said dice are contained, said leaf spring being abruptly deformable by pressing and releasing said shell, wherein the orientation of said dice on said support surface are changed,
  c. a plurality of holes in a portion of said game board uniformly arranged in a defined scoring field wherein said holes are arranged in rows and columns, said rows and columns each being identified by sequential numerical indicia,
  d. a plurality of associated pegs, said pegs being constructed for placement in said holes for scoring indicia, and,
  e. receptacle means on said game board for storing said plurality of associated pegs.

2. The game device of claim 1 wherein said dice are the configuraton of dodecahedron.

3. The game device of claim 1 comprising further a seating gasket interposed between said shell and leaf spring for releasably mounting said shell over said spring.

4. The game device of claim 3 wherein said leaf spring is located in a recess centrally positioned on said game board.

* * * * *